3,241,951
OXIDATION OF LEAD SULPHIDES TO FORM LEAD SULPHATE FOR SUBSEQUENT PRODUCTION OF LEAD
Frank A. Forward and Andrew I. Vizsolyi, Vancouver, British Columbia, and Herbert Veltman, Fort Saskatchewan, Alberta, Canada, assignors to Sherritt Gordon Mines Limited, Toronto, Ontario, Canada, a company of Canada
No Drawing. Filed Mar. 8, 1963, Ser. No. 263,717
7 Claims. (Cl. 75—120)

This invention relates to the treatment of lead mineral sulphides and, more particularly, to a method of treating lead sulphides to convert them to sulphates, in which form they are readily amenable to further treatment by known methods for the recovery of pure lead.

Methods are known for recovering lead from lead bearing material which involve leaching the lead bearing material in a basic aqueous leach solution which contains a member selected from the group consisting of alkylene and alkanol amines and derivatives thereof which is soluble in water. United States Patent No. 2,950,964, issued August 30, 1960, describes this method in detail.

One of the essential requirements for extracting lead from lead bearing ores by this amine leach process is that the lead be present as the sulphate, basic sulphate, or oxide (PbO). Thus, in order that the process may be applied to sulphide ores, means must be provided to convert the galena, PbS, to one of the forms mentioned. The conversion can be effected by roasting, but at the high temperatures involved, there is a strong probability that some of the lead present will, on oxidizing, form silicates or other compounds which are not soluble in the amine leach solutions. In addition, the smoke and fume problem associated with lead sulphide roasting necessitates that the plant be located in areas remote from centres of population or, alternatively, costly smoke and fume treating equipment must be provided. Methods are known and described in United States Patent No. 2,950,964, referred to above, for converting lead sulphide to lead sulphate by aqueous oxidation with sulphuric acid and oxygen at about 100° C. according to the following reaction:

(1) 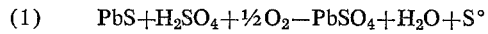
$$PbS + H_2SO_4 + \tfrac{1}{2}O_2 \rightarrow PbSO_4 + H_2O + S°$$

Also, oxidation can be accomplished above about 90° C. in aqueous media with oxygen alone according to the following reaction:

(2) 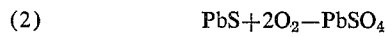
$$PbS + 2O_2 \rightarrow PbSO_4$$

There are a number of problems associated with these methods. The acid oxidation according to Equation 1 is very rapid, being complete in about one hour, but if continued too long, there is a tendency to form amine-insoluble compounds of lead and iron, especially if much zinc is present in the leach solution. Oxidation according to Reaction 2 proceeds relatively slowly, requiring at least 12 to 14 hours to reach completion.

We have found that the problems associated with the methods referred to above are overcome and additional advantages obtained by the method of oxidizing lead sulphides described in detail hereinafter.

The present method is based on the discovery that it is possible to oxidize galena rapidly and effectively at moderately elevated temperatures with an oxidizing gas using an aqueous solution of ammonium sulphate which contains dissolved ammonium sulphate in amount equivalent to a molar ratio of ammonium ion to lead of about 2.0 or above, and providing the galena contains sufficient iron to catalyze the reaction.

The method of this invention involves, therefore, the steps of reacting finely divided material consisting essentially of lead sulphides with an aqueous ammonium sulphate solution which contains ammonium sulphate in amount equivalent to an ammonium ion to lead molar ratio above about 2.0; agitating the slurry at a temperature above about 85° C.; and feeding an oxygen bearing, oxidizing gas into the agitated slurry to substantially completely oxidize the lead sulphides and convert them to sulphates. If the starting material does not contain the iron required to catalyze the oxidation reaction, this is provided from an extraneous source.

The method of the present invention is described in detail hereinafter as it is applied to the treatment of commercial lead sulphide concentrate containing some zinc and iron and as applied to the treatment of high purity galena containing less than 1% iron. It is not intended, however, to limit the invention to the treatment of these specific materials only.

In the treatment of commercial concentrates containing iron (generally as pyrrhotite) the mineral sulphides, preferably comminuted to a particle size smaller than about 150 microns, are dispersed in an aqueous ammonium sulphate solution which contains at least about 2.0 moles of ammonium ions per mole of lead dispersed in the solution. The solids to solution ratio is preferably adjusted to provide a slurry containing from about 10 wt. percent to about 50 wt. percent solids.

In the treatment of lead sulphites which do not contain iron or which contain insufficient iron to catalyze the oxidation reaction, the required iron can be provided by the addition of metallic iron or an oxidizable iron compound to the feed material or to the leach solution. Preferably the iron is provided in the form of finely divided ferric oxide, $Fe_2O_3$, or pyrrhotite, as these compounds are generally readily available and inexpensive. However, other iron compounds that will dissociate under the conditions of the oxidation reaction to provide ferric and/or ferrous ions in solution may also be used. Such materials include, but are not necessarily limited to, ferrous sulphate, ferric sulphate, and magnetite.

The amount of iron compound added depends, primarily, on the initial iron content of the starting material. The presence of any finite amount of iron in the lead sulphides will have some catalytic effect; it is preferred, however, to provide sufficient iron compound to raise the total iron content of the material treated to at least 5% by weight of the lead in the starting material.

The slurry, containing the finely divided lead sulphides, and added iron catalyst where required, is reacted in a reaction vessel such as an autoclave at a temperature above about 85° C., preferably between about 90° C. and about 120° C., with a free oxygen bearing gas, such as air, preferably under a partial pressure of oxygen of from about 5 to about 100 pounds per square inch. Higher temperatures and higher pressures can be used, but the increase in operating and equipment costs as a result of more severe conditions would not be offset by any increase in reaction efficiency that may be obtained.

Under these conditions, the oxidation proceeds at a rapid rate, being essentially complete in 2 hours. At the completion of the reaction, the solution is separated from the residue by a conventional liquids-solids separation, such as by filtration. The undissolved residue, which contains substantially all the lead content of the starting material in the form of lead sulphate, can be treated directly by the amine leach process referred to hereinabove to recover the leach as leach metal. The lead solution can be treated to recover any dissolved metals, such as zinc and copper for example, which may have been present in the feed material and which dissolve as complex ammines in the ammonium sulphate solution under the reaction conditions. The purified solution is then recycled to the oxidation step.

The reactions which take place in this system during the oxidation are very complex and are not fully understood. The overall reaction, however, might be expressed by the equation:

(3) $PbS + 2O_2 + (NH_4)_2SO_4 \rightarrow PbSO_4 + (NH_4)_2SO_4$

No ammonium sulphate is consumed in the oxidation reaction. Thus, insofar as the lead is concerned, this provides a system in which the aqueous solution of ammonium sulphate can be fully recycled, and there is no need to replenish the ammonium sulphate content of the solution except to compensate for minor mechanical losses. It would, however, be necessary to regenerate the proportion of ammonium sulphate that reacts with any soluble ammine forming metals that may be present in the feed material, such as zinc and copper for example. The recycled ammonium sulphate solution contains partially oxidized unsaturated sulphur compounds such as thionates and polythionates ($S_2O_3^{--}$ and $S_3O_6^{--}$) which result from the incomplete oxidation of sulphur released by the lead, but we have found that the presence of these compounds in the recycled solution does not affect the oxidation of subsequent batches of sulphides.

Although no specific explanation can be offered for the phenomenon, we have found that the oxidation according to the overall reaction represented by Equation 3 proceeds at a notably accelerated rate only when the $NH_4^+/Pb$ ratio is in the order of 2.5 or higher. Above this critical level, increased ammonium sulphate concentration results in slightly increased oxidation rates up to a concentration equivalent to a $NH_4^+/Pb$ molar ratio of about 6.0. There is no particular advantage in maintaining the $NH_4^+/Pb$ molar ratio above 6.0; the optimum concentration is that equivalent to an $NH_4^+/Pb$ molar ratio within the range of about 3.0 to about 4.5.

The following examples illustrate the operation of the present invention in practice:

EXAMPLE I

A series of tests were conducted on a commercial lead sulphide concentrate containing some zinc in the form of marmatite (Zn, Fe)S and iron as pyrrhotite (FeS). The concentrate analyzed as follows:

| | Percent |
|---|---|
| Pb | 66.2 |
| Zn | 3.0 |
| Cu | 0.2 |
| Fe | 11.4 |
| S | 14.5 |
| Insol. | 0.8 |

The material was ground in a ceramic pebble mill to about 97 percent minus 325 mesh standard Tyler screen. In each tests 500 grams of this material were slurried, to give a pulp density of 0.4 wt. percent, in aqueous ammonium sulphate solutions containing various amounts of ammonium sulphate. The batches of slurry were treated for various time intervals in an agitator equipped, stainless steel autoclave at a temperature of 110° C. and under an oxygen overpressure of 20 pounds per square inch (p.s.i.).

The results of these tests are set out in Table I.

Table I

| Test No. | $NH_4^+/Pb$ Ratio | Time, hrs. | Solution, pH | PbS-PbSO$_4$ Conversion, Percent |
|---|---|---|---|---|
| 1 | 1.0 | 2 | 7.9 | 16.1 |
|   |     | 4 | 7.7 | 33.5 |
|   |     | 6 | 7.9 | 45.5 |
|   |     | 10 | 8.0 | 68.0 |
|   |     | 14 | 8.0 | 83.2 |
| 2 | 2.0 | 1 | 8.3 | 68.8 |
|   |     | 2 | 7.9 | 75.8 |
|   |     | 4 | 7.6 | 84.8 |
|   |     | 6 | 7.4 | 98.0 |
|   |     | 8 | 7.2 | 98.2 |
| 3 | 3.0 | ½ | 8.8 | 27.6 |
|   |     | 1 | 8.2 | 86.2 |
|   |     | 1½ | 7.7 | 91.7 |
|   |     | 2 | 7.6 | 92.5 |
|   |     | 4 | 7.2 | 96.0 |
|   |     | 8 | 2.6 | 99.0 |
| 4 | 4.0 | 1 | 8.5 | 91.0 |
|   |     | 2 | 7.5 | 97.0 |
|   |     | 3 | 7.1 | 97.1 |
|   |     | 4 | 5.8 | 97.3 |
|   |     | 6 | 2.9 | 97.7 |
|   |     | 8 | 2.8 | 99.7 |
|   |     | 10 | 2.7 | 99.7 |
| 5 | 6.0 | ½ | 8.9 | 63.5 |
|   |     | 1 | 7.8 | 98.0 |
|   |     | 1½ | 7.2 | 98.0 |
|   |     | 2 | 7.1 | 98.0 |
|   |     | 4 | 6.8 | 98.0 |
|   |     | 6 | 3.3 | 98.0 |

The results in Table I clearly illustrate the effect of $NH_4^+$ concentration on the rate of oxidation of the sulphides. At a $NH_4^+/Pb$ ratio of 2.0, only 84.8 wt. percent of the PbS is converted to PbSO$_4$ in 4 hours and at a $NH_4^+/Pb$ ratio of 3 less than 1 hour is required to produce the same degree of oxidation. The optimum $NH_4^+/Pb$ ratio is between about 3.0 and 4.5, and it can be noted that there is little advantage in increasing the $NH_4^+/Pb$ ratio above about 5.

EXAMPLE II

This example was conducted to illustrate the effect of iron on the oxidation reaction. In this test a high purity galena containing 86.6% Pb, 0.2% Fe and 13.1% S, was treated. The material was ground to about 97% minus 325 mesh Tyler and slurried with ammonium sulphate solution to produce a pulp density of 14%. The $NH_4^+/Pb$ molar ratio was 4.0. The slurry was treated in an agitator equipped stainless steel autoclave at a temperature of 120° C. and under an oxygen overpressure of 20 p.s.i. After 3 hours treatment only 35 wt. percent of the PbS was converted to PbSO$_4$.

5 wt. percent iron, in the form of finely divided pyrrhotite, was added to a sample of the same low-iron galena and the material treated under the same conditions described in the preceding paragraph. After only 2 hours 97.5 percent of the PbS was converted to PbSO$_4$.

Table II.—Effect of re-cycling leach solutions

| Description | Retention time, hrs. | pH | Solutions, g./l. | | | | Pb conversion, percent |
|---|---|---|---|---|---|---|---|
| | | | $S_{Total}$ | $S_{SO_4}$ | $S_{S_2O_3}$ | $S_{S_3O_6}$ | |
| Starting run | ½ | 9.0 | 28.2 | 23.9 | 2.4 | 1.9 | 13.6 |
| | 1 | 8.9 | 30.8 | 22.6 | 3.6 | 4.6 | 25.0 |
| | 1½ | 8.7 | 32.6 | 24.6 | 1.5 | 6.5 | 54.5 |
| | 2 | 8.4 | 31.4 | 27.4 | 0.4 | 3.6 | 92.0 |
| 1st recycle | ½ | 8.5 | 29.0 | 21.7 | 2.2 | 6.1 | 38.2 |
| | 1 | 8.5 | 29.4 | 19.7 | 1.8 | 7.9 | 88.1 |
| | 1½ | 7.6 | 31.3 | 25.8 | 0.5 | 5.0 | 92.4 |
| | 2 | 7.1 | 30.7 | 27.8 | 0.1 | 3.3 | 97.2 |
| 2nd recycle | ½ | 8.8 | 26.6 | 19.5 | 2.9 | 4.2 | 11.6 |
| | 1 | 8.8 | 26.9 | 18.8 | 3.1 | 5.0 | 57.2 |
| | 1½ | 8.5 | 28.5 | 20.4 | 2.9 | 5.2 | 86.4 |
| | 2 | 7.4 | 30.6 | 26.4 | 3.3 | 3.3 | 99.5 |

EXAMPLE III

This example illustrates the effect of recycling solution from preceding reactions to treat fresh concentrate. The concentrate used was the same as that of Example I. The conditions used for oxidation were: temperature 90° C., oxygen pressure 20 p.s.i., pulp density 14%, retention time 2 hours. In the first cycle, ammonium sulphate solution was used; the $NH_4^+/Pb$ ratio was 4:1. At the completion of cycle I, the filtrate was separated from the residue and used directly to treat a second batch of concentrate. Similarly the filtrate from preceding cycle II was used in cycle III.

The results of these tests are shown in Table II.

The results in Table II demonstrate that the recycle solution is at least as effective in oxidizing subsequent batches of lead sulphides as in the initial make-up solution. Also, the presence of the partially oxidized sulphur compounds which remain in the recycle solution in various amounts have no apparent effect on the subsequent oxidation reactions.

The method of this invention possesses several important advantages. It enables the economic, rapid and substantially complete conversion of lead sulphides to sulphate form. The process complements the amine leach process referred to hereinabove to provide a process that, except for the final reduction of pure lead oxide to lead metal, is carried out at low temperatures in non-corrosive aqueous solutions and in which the reagents, with minor exceptions, are fully recycled.

It will be understood, of course, that modifications can be made in the preferred embodiment of the invention described and illustrated herein without departing from the scope of the invention defined by the appended claims.

What we claim as new and desire to protect by Letters Patent of the United States is:

1. The method of converting lead sulphide to lead sulphate by oxidation in aqueous media which comprises:
    (a) dispersing finely divided lead sulphide bearing material containing iron in an aqueous medium to form a slurry, said iron being in a form which will provide in solution under the reaction conditions defined in paragraphs (b) and (c) hereof ions selected from the group consisting of ferric and ferrous ions;
    (b) providing in said slurry ammonium sulphate in amount equivalent to an ammonium ion to lead molar ratio above about 2.0;
    (c) reacting said slurry at a temperature above about 85° C. with a free oxygen-bearing gas under a positive partial pressure of oxygen;
    (d) continuing said reaction to oxidize said lead sulphide and convert it to lead sulphate; and
    (e) separating the solid residue containing said lead sulphate from the aqueous solution.

2. The method according to claim 1 in which the starting material is substantially iron-free lead sulphide bearing material and iron is provided in amount equivalent to at least 5 wt. percent of the lead content of said starting material by the addition, from an extraneous source, of a member selected from the group consisting of metallic iron and oxidized iron compounds at least partially soluble in the leach solution.

3. The method according to claim 1 in which the starting material is substantially iron-free lead sulphide bearing material and iron is provided by the addition, from an extraneous source, of a member selected from the group consisting of ferric oxide, pyrrhotite, ferrous sulphate, ferric sulphate, and magnetite.

4. The method of converting lead sulphide to lead sulphate by oxidation in aqueous media which comprises:
    (a) dispersing in aqueous lead sulphide bearing material containing iron in an aqueous medium to form a slurry, said iron being in a form that will provide in solution under the reaction conditions defined in paragraphs (b) and (c) hereof ions selected from the group consisting of ferric and ferrous ions;
    (b) providing in said slurry ammonium sulphate in amount equivalent to an ammonium ion to lead molar ratio within the range of from about 2.0 to about 6.0;
    (c) reacting said slurry at a temperature within the range of from about 85° C. to about 120° C. with a free oxygen-bearing gas at a positive partial pressure of oxygen above about 5 pounds per square inch;
    (d) continuing said reaction to oxidize said lead sulphide and convert it to lead sulphate; and
    (e) separating the solid residue containing said lead sulphate from the aqueous solution.

5. The method of converting lead sulphide to lead sulphate by oxidation in aqueous media which comprises:
    (a) dispersing finely divided lead sulphide bearing material containing iron in an aqueous medium to form a slurry, said iron being in a form that will provide in solution under the reaction conditions defined in paragraphs (b) and (c) hereof ions selected from the group consisting of ferric and ferrous ions;
    (b) providing and maintaining in said slurry ammonium sulphate in amount equivalent to an ammonium ion to lead molar ratio within the range of from about 2.0 to about 6.0;
    (c) reacting said slurry at a temperature within the range of from about 85° C. to about 120° C. with a free oxygen bearing gas at a positive partial pressure of oxygen between about 10 pounds per square inch and about 100 pounds per square inch;
    (d) continuing said reaction to oxidize substantially all of said lead sulphide and convert it to lead sulphate;
    (e) separating the solid residue containing said lead sulphate from the aqueous ammonium sulphate solution; and
    (f) re-cycling said ammonium sulphate solution to treat fresh lead sulphide bearing material.

6. The method according to claim 5 in which ammonium sulphate is provided and maintained in the reaction slurry in amount equivalent to an ammonium ion to lead molar ratio of about 3.0 to about 4.5.

7. The method according to claim 5 in which the starting material is substantially iron-free lead sulphides and iron is provided in the slurry by the addition from an extraneous source of a member selected from the group consisting of metallic iron, ferric oxide, pyrrhotite, ferrous sulphate, ferric sulphate, and magnetite in amount equivalent to at least 5 wt. percent of the lead content of said starting material.

References Cited by the Examiner

UNITED STATES PATENTS

| | | | |
|---|---|---|---|
| 981,451 | 1/1911 | McKechnie | 75—101 |
| 2,647,828 | 8/1953 | McGauley | 75—103 |
| 2,726,934 | 12/1953 | Forward | 75—103 |
| 2,950,964 | 8/1960 | Forward | 75—108 |
| 3,113,860 | 12/1963 | Pagel | 75—17 |

DAVID L. RECK, *Primary Examiner.*